June 30, 1931. G. SIMONEL ET AL 1,812,415
MIRROR MITERING MACHINE
Filed April 2, 1925 4 Sheets-Sheet 1

INVENTORS
George Simonel and
William H. Johnson,
BY
Hood + Hahn
ATTORNEYS

INVENTORS
George Simonel and
William H. Johnson,
BY
Hood + Hahn.
ATTORNEYS

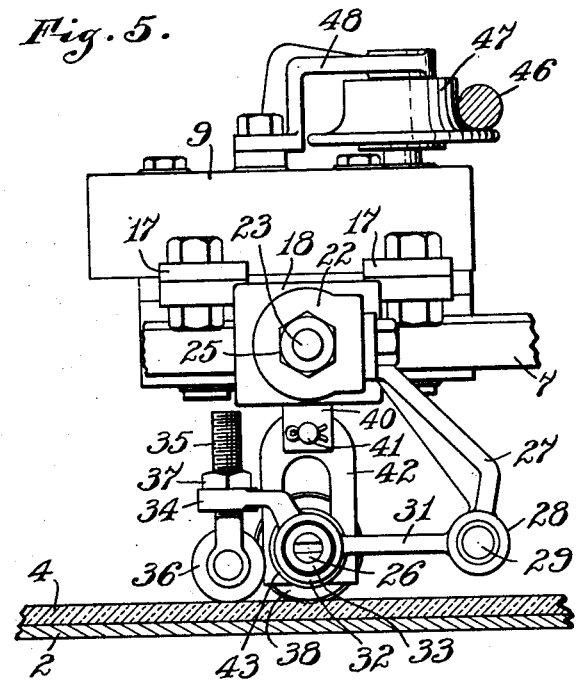
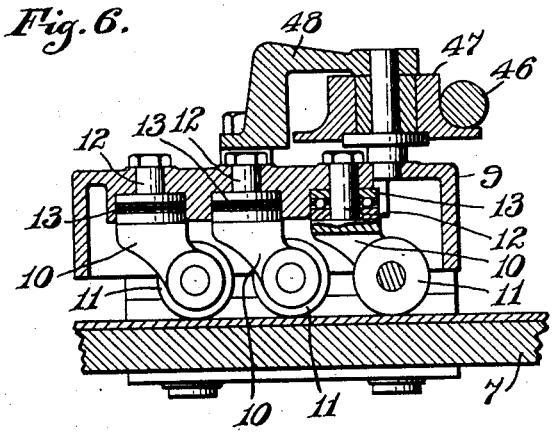

Patented June 30, 1931

1,812,415

UNITED STATES PATENT OFFICE

GEORGE SIMONEL, OF BLOOMINGTON, AND WILLIAM H. JOHNSON, OF TERRE HAUTE, INDIANA, ASSIGNORS TO THE NURRE MIRROR PLATE COMPANY, OF BLOOMINGTON, INDIANA, A CORPORATION OF INDIANA

MIRROR MITERING MACHINE

Application filed April 2, 1925. Serial No. 20,122.

Our invention relates to improvements in grinding machines and particularly to machines for grinding glass plates and the like.

One of the objects of our invention is to provide a machine for automatically grinding in the surface of glass plates irregular grooved lines commonly termed in the commercial art as miters.

Another object of our invention is to provide a machine wherein a track templet is provided for guiding the grinding wheel and in which, after the parts have been properly adjusted, the mechanism may be started and the mitering will take place without further attention on the part of the operator.

For the purpose of illustrating our invention we have illustrated one embodiment thereof in the accompanying drawings in which, Fig. 1 is a plan of a machine embodying our invention;

Fig. 5 is an end view of the grinding wheel carriage, and

Fig. 6 is a detail section of the carriage showing particularly the supporting rollers therefor.

Figure 1:
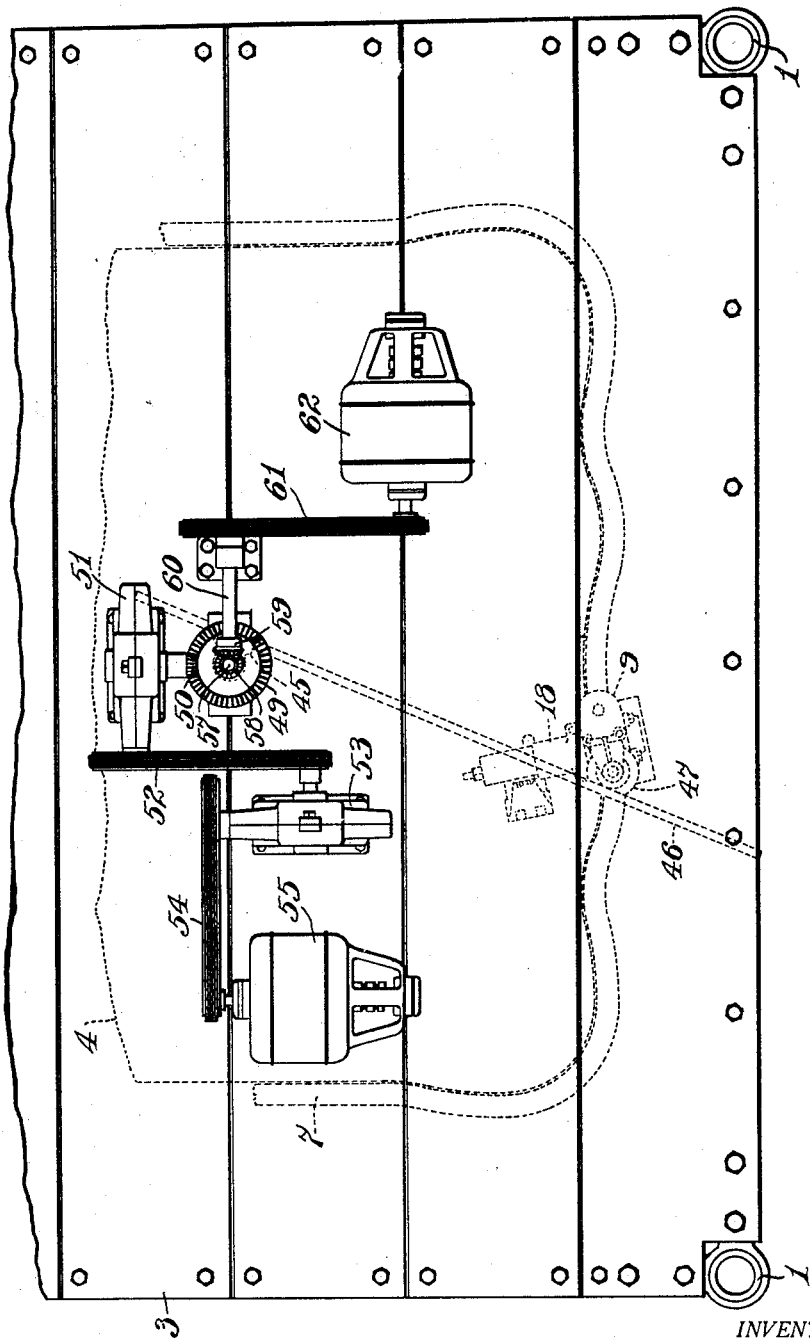
Figure 2:
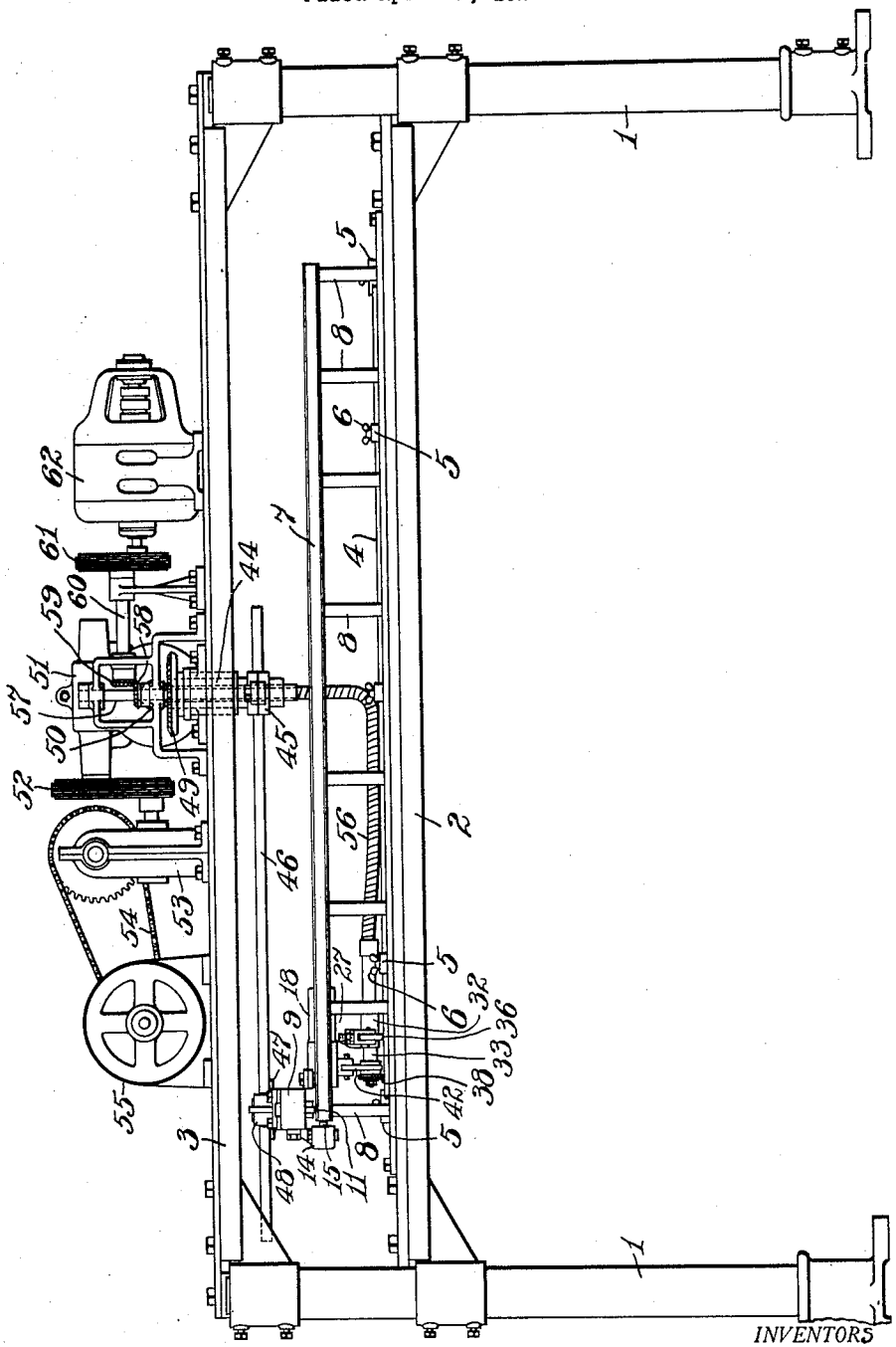
Fig. 2 is a side elevation thereof.
Figure 3:
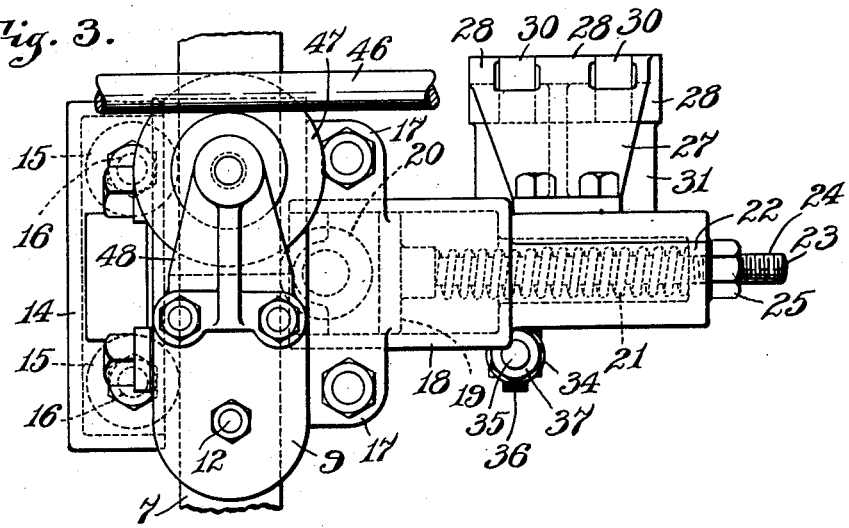
Fig. 3 is a plan view of the grinding wheel carriage.
Figure 4:
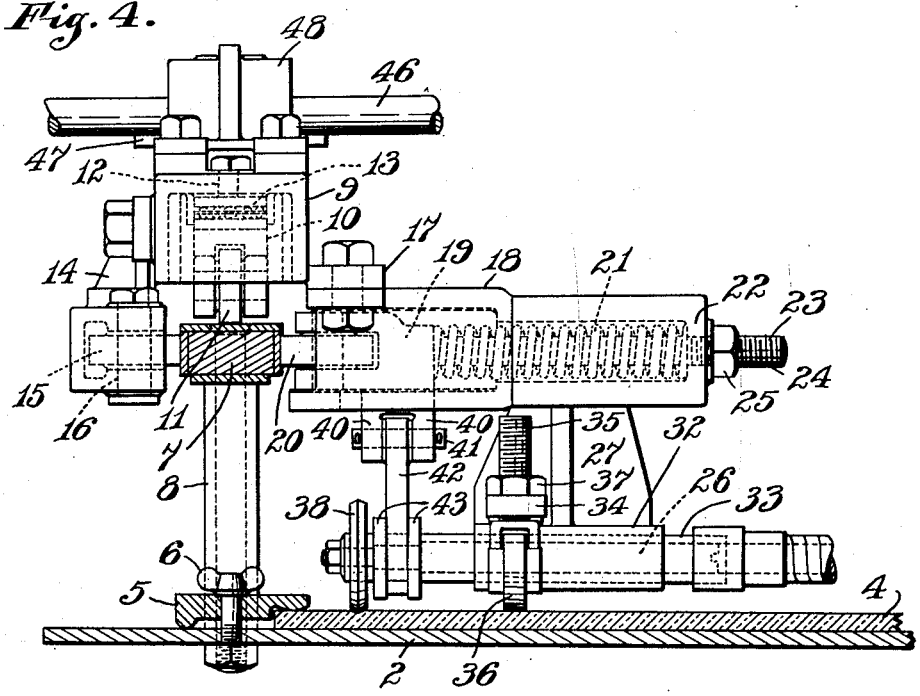
Fig. 4 is a side elevation thereof, part of the track templet and glass support being shown in section.

In the embodiment of the invention illustrated we provide a suitable supporting frame comprising the four corner posts 1 provided with a work supporting table 2 and at their tops with a mechanism supporting table 3. The glass 4 to be mitered is clamped upon the work supporting table 2 by suitable clamps 5 held in position on the table by thumb nuts 6 and adapted to overlap or overlie the edge of the glass. By screwing the clamps down the glass will be held against displacement on the table due to the spacing of the work holding clamps. The templet for guiding the grinding wheel perferably comprises a track templet structure 7 which is supported above the table on suitable legs 8. This track templet has the same configuration which is intended to be imparted to the miter on the glass and is arranged about the periphery of the glass.

Arranged to travel on the track 7 is a grinding wheel carriage 9 which is provided with a plurality of casters 10 having rollers 11 on which the carriage travels. These casters are pivoted on stems 12 extending through the top of the carriage and are provided with roller bearings 13 which permit the casters to swing readily on the stems so that as the carriage moves around on the track the supporting rollers will readily track. One side of the carriage is provided with a downwardly extending roller support 14 which lies adjacent one of the side faces of the track 7 and is provided with a pair of spaced apart rollers 15 mounted on spindles 16 supported in the roller support and these rollers 15 are adapted to engage the side face of the track. The opposite side of the carriage 9 is provided with a laterally extending ear 17 to which is adapted to be bolted the grinding wheel support 18. This support is preferably hollow on its under side and slidably mounted in guides formed in the hollow under side of the support is a sliding head 19 which carries a roller 20 arranged to engage the opposite side of the track 7. This sliding head 19 is urged into engagement with the side face of the track by a coiled spring 21 interposed between the rear end of the head and the rear wall 22 of the support 18, the spring being adapted to surround a guide post 23 projecting from the sliding head 19 and extending through the rear wall 22. The rear end of this post 23 is screw threaded as at 24 to receive an adjusting nut 25. The grinding wheel shaft 26 is supported from the supporting member 18 and to this end the supporting member is provided with an inclined downwardly extending arm 2 having at its lower end spaced apart rounded bosses 28 through which is adapted to project a supporting pin 29. The supporting arm for the grinding wheel shaft at its rear end is provided with a plurality of rounded bosses such as 30, which are inter-digitated with the bosses 28 and which also receive the pin 29 to provide a hinged joint for the shaft arm 31. The free end of this arm carries a journal 32 in which is slidably mounted a bushing 33 and through which projects the grinding wheel shaft 26. An overhanging arm 34 projects from the supporting arm 31 and this arm is provided with a threaded stem 35 having a roller 36 at its lower end and an adjusting nut 37 by which the arm 34 may be raised or lowered for varying the depth of cut of the grinding wheel 38 which is supported on the free end of the shaft 26 in proximity to the top surface of the glass 4 to be mitered.

The sliding head 19 is provided with a pair of spaced apart arms 40 between which is pivotally supported upon the pin 41 the upper end of a yoke 42 the arms of which are adapted to straddle the bushing 33 between the flanges 43 of the bushing whereby any transverse movement imparted to the head 19 will likewise be imparted to the bushing 33 and with it the grinding wheel 38.

For driving the carriage 9 around the track 7 we provide a driving mechanism mounted on the top table 3. To this end we provide a hollow vertical spindle 44 rotatably supported in the top table 3 and having at its lower end a clamp 45 adapted to have secured therein the operating arm 46. This arm at its outer end engages behind a roller 47 on the top of the carriage 9 and rotatably mounted on a spindle supported by the top of the carriage and an overhanging arm 48 bolted on the carriage. The upper end of the spindle 44 is provided with a bevel gear 49 meshing with a bevel pinion 50 operated from a gearing 51 driven by a chain drive 52 in turn operated by a second gearing 53 operated by a chain drive 54 from an electric motor 55.

The shaft 26 of the grinding wheel is driven from a flexible shaft 56 in turn driven from a vertical shaft 57 passing through the hollow spindle 44 and having at its upper end a bevel gear 58 meshing with a bevel gear 59 the shaft 60 of which is driven by a chain drive 61 from an electric motor 62.

In operation the plate glass to be grooved or mitered is clamped in position upon the table 2. The track 7 is then built or laid around the glass with the configuration desired after which the carriage is mounted on the track, the rollers 11 resting upon the upper part of the track and the rollers 15 bearing on the outer vertical side. The roller 20 is urged into engagement with the inner vertical side of the track by the coiled spring 21. The depth of the cut is adjusted by adjusting nut 37 so that the grinding wheel 38 will bear upon and cut the surface to the desired depth. The carriage driving motor is then started and through the connecting rod 46 the carriage is driven around on the track 7. At the same time the motor driving the grinding wheel 38 is started and as the carriage moves on the track 7 the wheel will grind a grooved line in the surface of the glass. Due to the two point contact of the carriage through the rollers 15 on one side of the track and the one point contact of the carriage through the roller 20 on the opposite side of the track, the carriage will follow the irregular contour of the track and maintain the grinding wheel always tangent to the line of cut.

We have disclosed an abrading cutting wheel in the application as the grinding wheel. It is, however, obvious that various types of wheels may be used, including burnishing or polishing wheels if so desired, and where in the claims we have referred to a grinding wheel it will be understood that this term is comprehensive enough to include either a polishing or buffing wheel. A burnishing or polishing wheel is particularly useful for polishing the groove after it has been cut by the grinding wheel and can be guided in said groove during its polishing operation in the same manner as the grinding wheel is guided in cutting the groove.

We claim as our invention:

1. In a machine for grooving glass plate, the combination with a stationary support for the glass plate to be grooved, of a carriage arranged to be moved in an irregular path over the surface of said plate, a templet for guiding said carriage in said path, a grinding wheel shaft carried by said carriage, a grinding wheel mounted on said shaft, and means engaging opposite vertical walls of said templet at one and two points respectively for maintaining said grinding wheel shaft in fixed angular relation to the vertical walls of said templet.

2. In an apparatus for grooving glass plate, the combination with a track templet, of a carriage arranged to travel on said track, means on said carriage engaging a side face of said track at spaced apart points, a rotary grinding wheel supported on said carriage with its axis substantially parallel to the surface to be operated on, a member on said carriage contacting with the other side face of the track, resilient means for urging said member into engagement with the track and means connecting the grinding wheel with said member to cause the same to move in response to movement of said member.

3. In a machine for grooving glass plate, the combination with a track templet, of a carriage arranged to travel on said track and including a yoke embracing said track, one leg of said yoke contacting with the track at spaced apart points the opposite leg of said yoke contacting with the track at a single point intermediate of said spaced apart points, and a rotary grinding wheel carried by one of the yoke legs with its axis substantially parallel to the surface to be operated upon.

4. In a machine for grooving glass plate, the combination with a track templet, of a carriage arranged to travel on said track and engage a vertical wall thereof at two spaced apart points, a grinding wheel shaft support mounted on said carriage, means carried by said support and movable toward and from the opposite vertical wall of said track with a right line movement, means for biasing said last named means toward contact with said last mentioned vertical wall of said track, a grinding wheel shaft mounted on said support and a grinding wheel carried by said shaft and operatively engaged by said movable means.

5. In a machine for grooving glass plate, the combination with a bed for supporting the plate to be grooved, of a track templet mounted on said bed, a carriage traveling on said track, a grinding wheel shaft supported by said carriage in a position above said bed and means for maintaining said shaft in fixed angular relation to said track as the carriage travels thereon including a two point, spaced apart contact of said carriage with one of the vertical walls of said track, a one point contact intermediate said first-mentioned contacts with the opposite vertical wall of the track and resilient means for urging said last mentioned contact into engagement with the track wall.

6. In a machine for grinding glass plate, the combination with a bed for supporting the plate, of a track templet on said bed, a carriage arranged to travel over said bed, a grinding wheel shaft supported by said carriage, a grinding wheel mounted on said shaft with its face disposed at an angle to the surface to be ground and means on said carriage engaging one of the vertical walls of said track at two spaced apart points and means resiliently held into engagement with the opposite vertical wall of said carriage at a point intermediate of said first two mentioned spaced apart points for maintaining the grinding wheel shaft in fixed angular relation to said track.

7. In a machine for grinding plate glass, the combination with a bed for supporting the plate to be ground, of a track templet mounted on said bed, a carriage arranged to travel over said bed, a grinding wheel shaft mounted on said carriage and a grinding wheel carried by said shaft, a yoke on said carriage embracing said track and comprising means contacting one vertical wall of said track at two spaced apart points and means contacting the opposite vertical wall of said track at a single point intermediate of said first two mentioned points and resilient means biasing said last mentioned means toward the track.

In witness whereof, we have hereunto set our hands respectively at Bloomington, Indiana, and Terre Haute, Indiana, this 28th day of March, and 30th day of March, 1925.

GEORGE SIMONEL.
WILLIAM H. JOHNSON.